March 21, 1939. C. DE GANAHL 2,151,422
CLOSED SECTION WELDER
Filed May 25, 1937 2 Sheets-Sheet 1
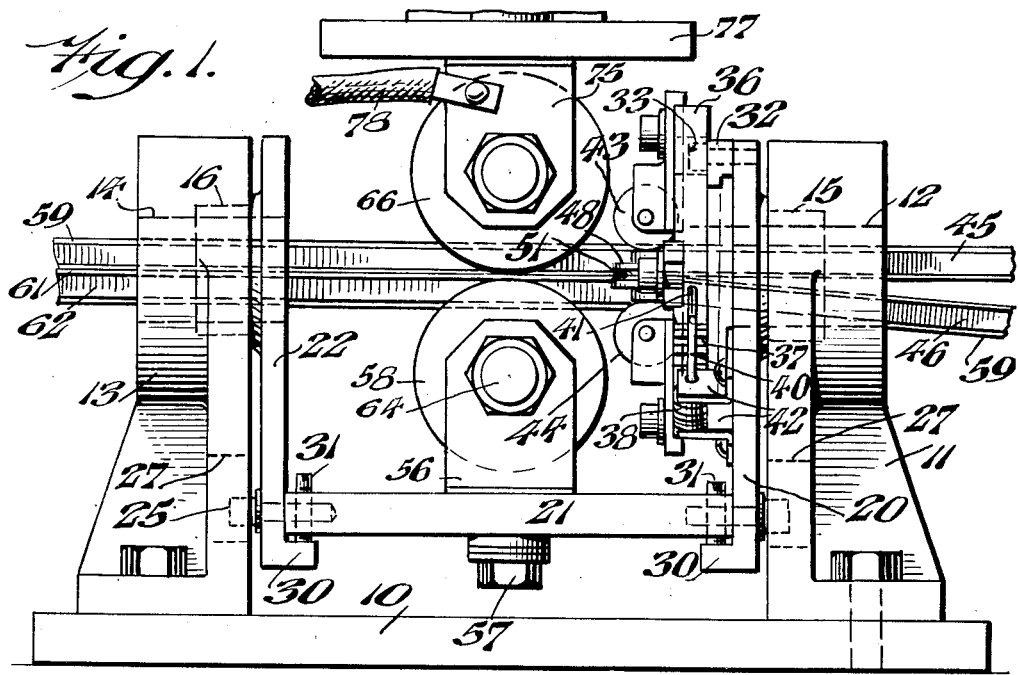
Fig. 1.
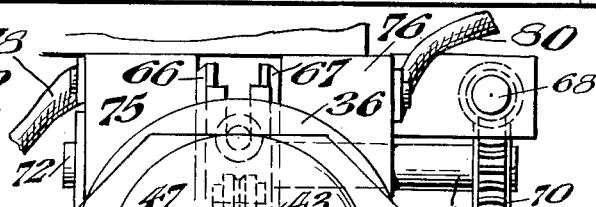
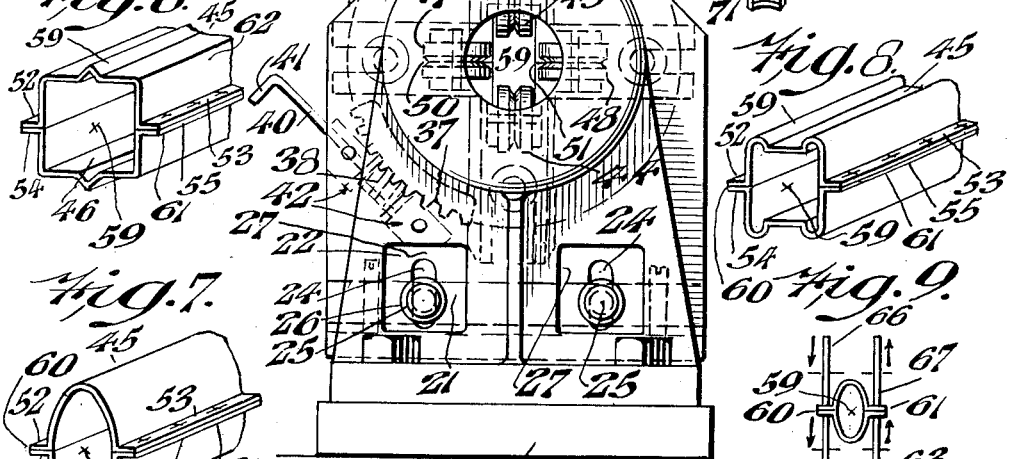
Fig. 2. Fig. 6. Fig. 8. Fig. 7. Fig. 9.
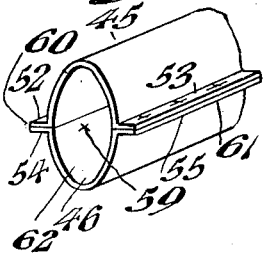
INVENTOR
CARL DE GANAHL.
BY
Frank H. Borden
ATTORNEY

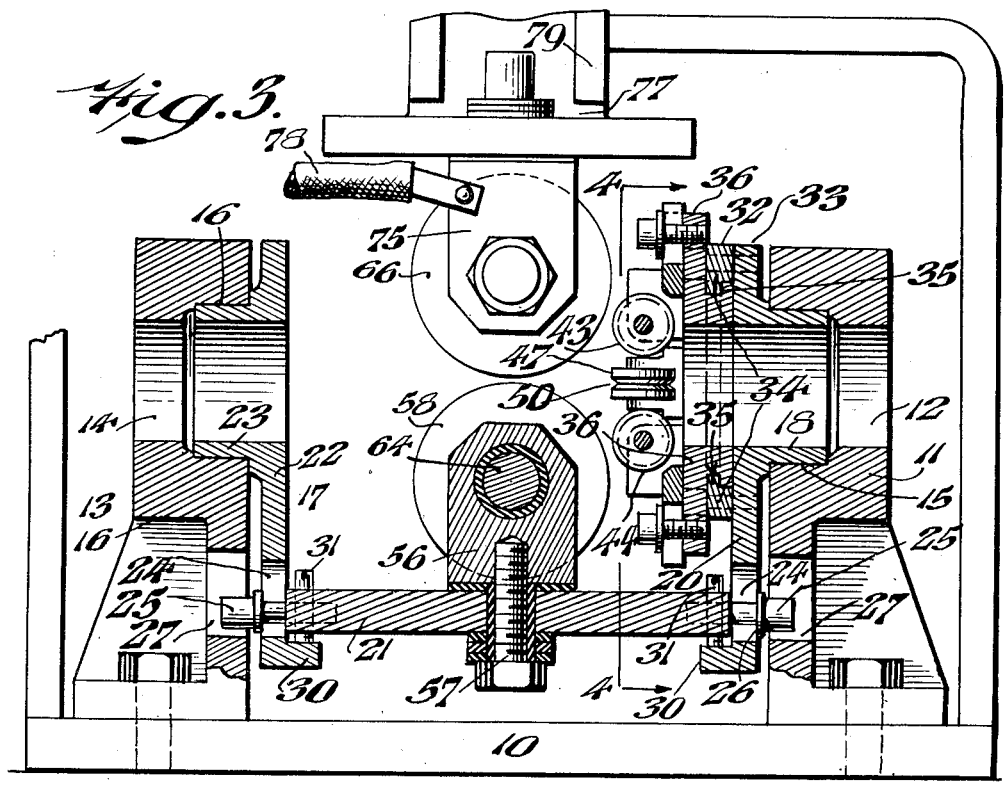
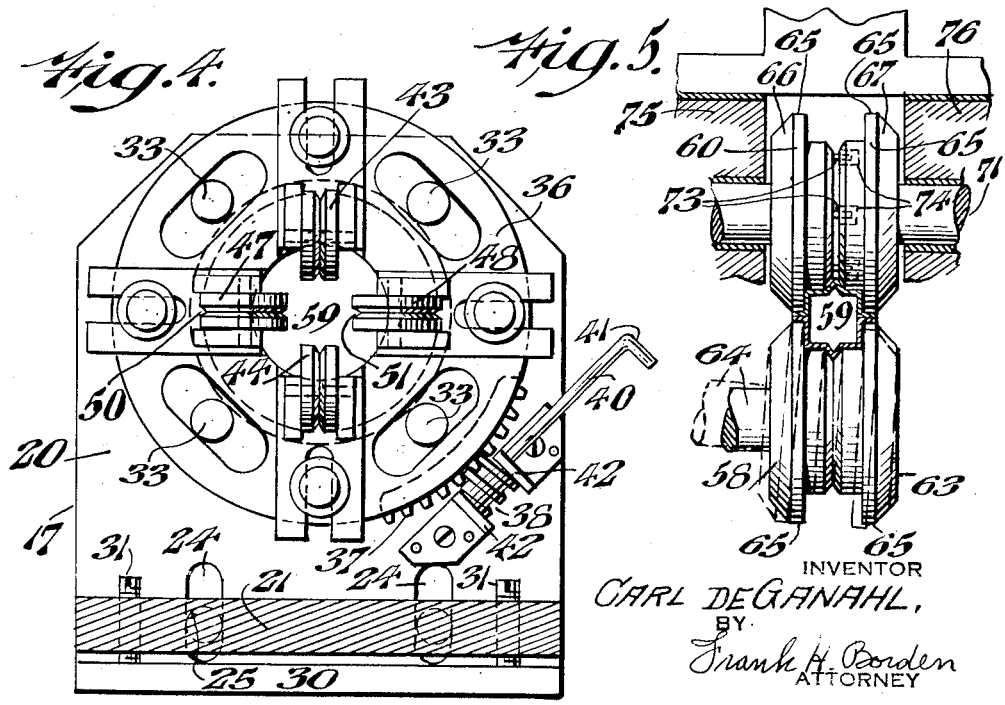

Patented Mar. 21, 1939

2,151,422

UNITED STATES PATENT OFFICE 2,151,422

CLOSED SECTION WELDER

Carl de Ganahl, Bristol, Pa., assignor to Fleetwings, Inc., Bristol, Pa., a corporation of Delaware Application May 25, 1937, Serial No. 144,593

16 Claims. (Cl. 219—4)

This invention relates to an apparatus for welding closed sections, and particularly to a device for spot welding the flanges of two complemental flanged strip portions.

In application Ser. No. 5,191, filed February 6, 1935, of Roy A. Miller, there are shown several closed strut sections, among many other forms that may be welded by this device. The particular characteristic underlying the closed sections to be welded by the invention is the provision of elongated complemental strips each of which has lateral flanges separated by median portions, which latter may be formed of a bead or beads, if desired. These strips may be independently formed, as by rolling, and if desired may be elongated to the limit of length of strips from which they are formed, as the short struts or reduced lengths of closed sections may be cut from the finished or completed longer sections.

When welding the juxtaposed flanges together by rolling electrodes there are two factors potentially militating against perfect, uniform and satisfactory elongated completed section. One lies in a tendency of the closed section to develop a twist as it leaves the electrodes, and this, once becoming well developed, militates against the utility of that part of the closed section possessing the twist. The other is faulty welding, due to uneven pressure of the electrodes arising from various causes.

It is among the objects of this invention; to overcome the defects of the prior art; to provide an improved device for welding closed sections together; to provide means for preventing or nullifying twist in a closed section as it passes through a welding device; to provide a welding device for closed sections in which the welds are each alike and uniform throughout the sections; and many other objects and advantages as will become more apparent as the description proceeds.

In the accompanying drawings forming part of this description,

Fig. 1 represents a side elevation of the preferred form of the invention,

Fig. 2 represents an end elevation thereof,

Fig. 3 represents a longitudinal vertical section, partially in elevation through the device of Fig. 1, Fig. 4 represents a vertical transverse section on line 4—4 of Fig. 3, Fig. 5 represents a vertical fragmentary section through the device of Fig. 1, showing the welding roller electrode assembly in full lines, and showing in dotted lines an exaggerated adjusted position of the lower electrode assembly, Figs. 6, 7 and 8 represent perspectives of illustrative forms of closed section struts such as may be formed by the device of this invention, and Fig. 9 represents diagrammatically the course of the welding current as the pairs of roller electrodes simultaneously weld two laterally spaced electrodes.

A stationary frame 10 has at one end a fixed bracket 11 having a horizontal bore 12 through which the two complemental flanged strips, to be described, are fed. At the other end of the frame 10 is a second fixed bracket 13, having a horizontal bore 14, in concentric alignment with bore 12 of bracket 11. Bore 14 is the exit for the finished welded section. Bore 12 enlarges into a journal or bearing 15, and bore 14 enlarges into a journal or bearing 16. An electrode-supporting cradle 17 is supported at the entry end of the apparatus by the gudgeon sleeve or hollow boss 18 pivoted in the journal 15, and mounted rigidly on bracket arm 20. The cradle base 21 of the cradle 17 has an adjustable connection at each end, to be described, and is supported at the exit end by the bracket 22 having the offset gudgeon, supporting sleeve or hollow boss 23 oscillatably engaged in bearing 16 of fixed bracket 13.

Bracket 20 has a pair of spaced parallel vertical slots 24 through each of which bolt 25 extends into the end of base 21 to pull it tightly against the bracket arm 20 to insure the rigidity of the cradle. Washer 26 engages under the head of bolt 25 and engages the outer face of the bracket. Openings 27 are provided in fixed bracket 11 to provide clearance for the heads of bolts 25 to permit swinging adjustments of the cradle, to be described. Bracket 20 has a lower step or flange 30 over which the base plate 21 extends. Set screws 31 extend through the base plate 21 to impingement or abutment against the flange 30 to secure fine adjustments and settings in the angular relation of cradle base 21 and the bracket arms, as will be clear. The exit end of the cradle base and bracket 22 is similar to that just described for bracket 20 so the description will not be repeated in detail. It will be clear that the hollow bosses 18 and 23 provide channels or orifices concentrically aligned with the respective bores 12 and 14, so as to furnish a through passage for the work.

A fixed two-piece ring 32 is fastened to the face of the swinging bracket 20 by means such as bolts 33, and has an integral flange 34 extending radially inward and engaging in a peripheral groove or recess 35 of the angularly adjustable centrally apertured guide plate 36. The guide plate has a series of teeth 37 formed or mounted on its periphery for a limited arcuate distance, which are in mesh with a worm gear 38 mounted on a shaft 40 having a handle 41 and journalled at 42 on the bracket arm 20. It will be evident that the plate 36 is held in a fixed angular position relative to the bracket arm 20 and base plate 21, by the worm and sector shown, and, further, that this angular relation is controllable and repositionable by turning handle 41 and worm 38.

It will be understood that any sort of sections can be welded so long as the halves are complemental. The halves need not be symmetrical of the median plane between them so long as they each have portions to be welded to complemental portions of the other. Illustratively, Figs. 6, 7 and 8 each show a closed section broadly composed of half strips 45 and 46, with strip 45 having oppositely disposed flanges 52 and 53, lying in a substantially common plane, and strip 46 has similar flanges 54 and 55. The characteristics of each strip between the flanges will be as desired, although preferably at least one bead 59 is formed therein extending the full length of the strip.

On the face of the guide plate 36 are the several guide rollers respectively 43 and 44, for substantially vertical pressure substantially on or adjacent to the median lines of the complemental portions 45 and 46, and lateral compressing flange associating rollers 47 and 48, having central grooves 50 and 51 to receive and force together the adjacent flanges 52 and 54 and flanges 53 and 55. The assembled composite flanges when forced tightly together, and as held together subsequently by welding, are respectively designated as flange 60 and 61 of a section 62. Each roller is mounted on a radially adjustable bracket on the face of the guide plate or disposed in radial slots therein. Obviously the faces of the guide rollers and their disposition relative to the axis of the device will be varied, by replacements or adjustments, according to the contours and sizes of the strips to be joined in the closed section 62.

It will be clear that with the strips disposed in confronting juxtaposition they may be fed axially through bore 12 and hollow boss 18, then through the guide rollers to delivery in front of the guide rollers with the juxtaposed flanges in closely engaged, but unsecured, relation.

Mounted on the base 21 of the cradle in insulated relation thereto is the journal block 56 held in adjustable anchored position by an insulated bolt 57 or the like, and carrying the pair of electrically coupled roller electrodes 58 and 63 on a shaft 64 insulatedly journaled in block 56. The roller electrodes 58 and 63 have each a peripheral contact area 65. A plane parallel to base 21 is parallel to a tangent to the peripheral areas 65 of the rollers 58 and 63. It will be clear also that such a plane tangent to the contact areas would continue to remain parallel to the base as the cradle swings on its pivotal axis 59, concentric of the closed section, although of course changing its angular position relative to the fixed portions of the support.

Vertically adjustable relative to the fixed portions of cradle and guide assembly, and arranged for vertical movement under pressure, as from a suitable cylinder and piston arrangement (not shown) the power driven insulatedly driven roller electrodes 66 and 67 are provided, journalled in blocks 75 and 76. The rollers are driven by any desired and suitable means such as a suitably driven worm shaft 68 and worm gear 70 on the end of a shaft 71 driving roller 67 which it supports. Roller 66 is independently supported on a shaft 72, and a driving connection is established between the rollers as by insulated pins 73 mounted on one roller and extending into recesses 74 in the other. Each roller has a peripheral contact area 65, disposed to engage the respective upper flange portions of the composite flanges 60 and 61 of the section 62 and to squeeze the flanges against the cradle supported rollers 58 and 63. Blocks 75 and 76 are in electrical connection or engagement with the respective upper roller electrodes 66 and 67, but insulated from each other and from the supporting frame 77, and cable connections 78 and 80 are secured to each block and lead to a timing welding circuit controller by and from which, if the blocks were electrically connected, a welding current would pass. As the blocks are not connected the complete welding circuit is as follows: from cable 78, through roller 66, flange 60, roller electrode 58, roller electrode 63, flange 61, roller electrode 67, and cable connection 80.

The operation of the device is as follows: The guide roller assembly being adjusted as to type of roller, and radial adjustments thereof, for the type of section 62 to be welded, is then adjusted angularly, by turning handle 41, until the rollers are longitudinally aligned, substantially with the plane of the meeting faces 65 of the upper and lower roller electrodes. Suitably rolled strips 45 and 46 are then juxtaposed and inserted axially through the bore 12, into engagement with the respective compressing rollers, and fed forward until the advancing edge is substantially over the vertical center of rollers 58 and 63. At this stage the upper rollers 66 and 67 have been pulled vertically upward, with their support, and the frame or cradle has found its position by gravity. The adjustable parts will be adjusted so as to secure, as far as possible, simultaneous contact of flanges 60 and 61 with the upper surfaces of roller electrodes 58 and 63, before the upper electrodes are forced downwardly.

Then by suitable pneumatic, hydraulic, electric, or other means roller electrodes 66 and 67 and their supporting frame 77 are forced downwardly relative to a guide 79 fixed relative to the stationary frame 10 into engagement with the upper surfaces of flanges 60 and 61, symmetrically on each side of a longitudinal vertical plane containing the pivotal axis 59 of the cradle, which causes the cradle to swing laterally to one side or the other, depending upon the relative thicknesses of flanges 60 and 61, or upon the degree of erosion and wear on the contact surfaces of the electrodes, or as a resultant of all of the factors, until the pressure effective to squeeze flange 60, is exactly the same as that effective to squeeze flange 61, so that the resistance of both flanges to the welding current is practically the same, so that the subsequent welds are substantially identical. The worm drive is then started simultaneously with the starting of timed pulsations of welding current and the flanges 60 and 61 of the section 62 are simultaneously fed forward toward and through the exit end while they are being spot welded. It is preferred that the rate of feed by the driving of the rollers be susceptible of variation so that with given timed welding intervals, the resultant welds can be either variably spaced or overlapped to cause a seam weld. It will be clear that the swinging cradle will continue to adjust for variations in the flange thickness, etc., to always maintain even welding pressure.

For various reasons it sometimes occurs that the completed section 62 as it emerges from between the welding rollers begins to develop a twist which, if continued, would destroy the utility of the section. To overcome this tendency toward a torque reaction, it is necessary to impose on the section a cancelling or nullifying opposite torque before the section becomes "set" and substantially rigid by the welding. This is the function of the angularly adjustable guide roller assembly and worm control 38. The operator simply turns handle 41 in the proper direction to change the angular relation of the common plane of the flanges 60 and 61 relative to the average plane of mutual tangency of the respective upper and lower electrode rollers so that a twist is imparted nullifying that undesirable one that has been observed.

The simplicity, economy and advantages of the invention will be apparent, as will the fact that any sort of section, including superposed flat sheets or flanges may be formed with two spaced rows of spot welds, with deformations either between the rows (as shown), or laterally beyond the rows (not shown), or simply as flat sheets.

I claim:

1. In welding devices a pair of vertically adjustable roller electrodes, a complemental pair of roller electrodes disposed to form juxtaposed pairs of electrodes, means supporting one pair of electrodes for adjustment about a pivot in the plane of contact with the other pair of electrodes to equalize the pressure between juxtaposed pairs of electrodes.

2. In welding devices, a pair of spaced roller electrodes having a fixed bodily angular position, a pair of spaced roller electrodes with the respective electrodes of the second pair juxtaposd to respective electrodes of the first mentioned pair, said second pair being bodily angularly adjustable responsive to relative pressure between pairs of electrodes.

3. In welding devices, a support, a cradle pivoted on the support on an axis longitudinal of the support, a pair of roller electrodes fixed to the cradle respectively on opposite sides of the axis, a pair of roller electrodes arranged for bodily movement relative to said support and respectively on opposite sides of said axis, and the rollers of each pair being in substantial mutually tangential juxtaposition to engage work moving longitudinally of such axis.

4. In welding devices, a support, a cradle pivoted on the support on an axis longitudinal of the support, a pair of roller electrodes, on each side of the pivot, means supporting the electrodes for movement substantially perpendicular to the axis, a second pair of electrodes mounted on the cradle on each side of the axis arranged to be substantially engaged by the first pair of electrodes to engage and weld work moving axially through said device.

5. In welding devices, guide means for guiding advancing work, welding rollers in the path of such work after it leaves the guide means, and means for changing the angular relation of the guide means and rollers to establish a twist in the work advancing to the rollers to nullify a twist in the work leaving the rollers.

6. In welding devices, means for simultaneously welding two spaced rows of welds in an elongated strip, and means arranged to control the angular relation of the strip and first means so as to nullify twists therein.

7. In welding devices, means for simultaneously welding two spaced flat portions of an element with the flat portions lying in a substantially common plane, means for distorting the plane of the flat portions relative to the welding plane prior to welding to prevent an opposite distortion of the plane after the welding.

8. In welding devices, a support, a plurality of guide rollers on the support arranged to press two shaped strips together about an axis, welding rollers for simultaneously forming two rows of welds in the strips to secure them rigidly together, and means for angularly repositioning the guide rollers relative to the axis of the strips during the welding operation.

9. In welding devices, a pair of roller electrodes electrically coupled, a pair of relatively insulated cooperating roller electrodes, means for driving one of the last mentioned electrodes and an insulating connection between the last mentioned electrodes to cause them to be driven together.

10. In welding devices, a support, a cradle journalled on the support, a pair of spaced roller electrodes mounted on the cradle for rocking therewith with the axis of the electrodes normally perpendicular to a vertical plane containing the cradle axis, a pair of electrode rollers mounted for vertical movement relative to said support, said last mentioned rollers having contact peripheries aligned with the contact peripheries of the cradle mounted electrodes and respectively on each side of said vertical plane and the whole so arranged that the positioning of the cradle on its axis is incidental to equalization of pressure between the respective pairs of substantially aligned rollers.

11. In welding devices, guide means for guiding advancing work, welding rollers in the path of such work after it leaves the guide means, and means for changing the angular relation of the guide means and rollers to establish a twist in the work advancing to the rollers to nullify a twist in the work leaving the rollers, and means for equalizing pressures between welding rollers so as to maintain equality between the rows of welds.

12. In welding devices, a support having a feeding bore for advancing work, a cradle comprising a bracket, said bracket pivoted on the support on an axis substantially concentric with the bore and having a feed aperture aligned with the bore, a guide roller plate, a plurality of rollers mounted radially aljustably on the plate, means mounting the plate on the bracket with the rollers in the path of the work in the bore, and means for angularly repositioning the plate relative to the bracket.

13. In welding devices, a support having a feeding bore for advancing work, a cradle comprising a bracket, said bracket pivoted on the support on an axis substantially concentric with the bore and having a feed aperture aligned with the bore, a guide roller plate, a plurality of rollers mounted radially adjustably on the plate, means mounting the plate on the bracket with the rollers in the path of the work in the bore, means for angularly repositioning the plate relative to the bracket arm, a pair of welding electrode rollers mounted on the cradle with their contact peripheral areas substantially tangent to a plane substantially containing said axis, a movable pair of electrode rollers mounted on the support and arranged to dispose their peripheral contact areas substantially tangential to said plane and to exert pressure effective on the first mentioned pair of rollers to swing the cradle and attached rollers to equalize the contact pressure between juxtaposed rollers.

14. In welding devices, a support, a plurality of guide rollers on the support arranged to press two shaped strips together about an axis, welding rollers for simultaneously forming two rows of welds in the strips to secure them rigidly together, and means for angularly repositioning the guide rollers relative to the axis of the strips during the welding operation, and means to equalize the pressure between the respective welding rollers to secure uniform welds.

15. A method of welding which comprises associating two strips, advancing the associated strips through welding means, and in changing the angular relation of the associated strips to the welding means as they pass to the welding means in order to nullify an observed twist in the finished strip leaving the welding means.

16. A method of welding which comprises the step of twisting the work entering a welding device in order to nullify a developing twist in the work leaving the welding device.

CARL DE GANAHL.